(12) United States Patent
Fitzpatrick

(10) Patent No.: US 7,849,083 B2
(45) Date of Patent: Dec. 7, 2010

(54) AUTOMATIC CREATION OF OUTPUT FILE FROM IMAGES IN DATABASE

(75) Inventor: Daniel G. Fitzpatrick, Middle Grove, NY (US)

(73) Assignee: Advertising Processing, Inc., Paradise Valley, AZ (US)

( * ) Notice: Subject to any disclaimer, the term of this patent is extended or adjusted under 35 U.S.C. 154(b) by 0 days.

(21) Appl. No.: 11/094,506

(22) Filed: Mar. 30, 2005

(65) Prior Publication Data

US 2005/0262131 A1 Nov. 24, 2005

Related U.S. Application Data

(60) Provisional application No. 60/558,007, filed on Mar. 31, 2004.

(51) Int. Cl.
*G06F 7/00* (2006.01)
(52) U.S. Cl. .................. 707/732; 707/705; 707/722; 707/758
(58) Field of Classification Search ............... 707/1, 707/2, 3, 10, 100, 4, 104.1, 999.001, 999.002, 707/999.003, 999.004, 999.107, 705, 722, 707/758, 732
See application file for complete search history.

(56) References Cited

PUBLICATIONS

Bott et al., "Special Edition Using Microsoft Office 2000", Copyright 1999, Que Corporation, pp. 1-41.*
Microsoft Corporation, Microsoft PowerPoint 2000, Copyright 1999, Product ID 50637-752-3126295-02661.*
Rutledge et al., "Special Edition Using Microsoft PowerPoint 2000", Copyright 1999, Que Corporation, pp. 1-22.*
Jerry Honeycutt, Windows 2000 Professional, Apr. 18, 2000, Sams, Chapter 4. Integrated Searching.*
Jim Boyce, Windows 2000 Quick Fixes, Dec. 2000, O'Reilly, Section 4.13. Add a new option to the Send to menu.*
Rutledge et al., Special Edition Using Microsoft PowerPoint 2000, May 6, 1999, Que, Chapter 2. Creating a Basic Presentation and Chapter18. Integrating with Office 2000.*
Bill Camarda, "Special Edition Using Microsoft Office Word 2003", Dec. 2003, Que, 14 pages.*

* cited by examiner

*Primary Examiner*—Hung Q Pham
(74) *Attorney, Agent, or Firm*—Wayne F. Reinke, Esq.; Heslin Rothenberg Farley & Mesiti P.C.

(57) ABSTRACT

A query is run against a database with information related to images. Images of interest are selected for inclusion in an output file, for example, a presentation application file. Configuration and other choices are made regarding the output file, and any other information needed to generate the output file is gathered. When all the necessary information is available, an output file is automatically generated and delivered to a user. The output file includes the selected images and identifying information about the images.

51 Claims, 7 Drawing Sheets

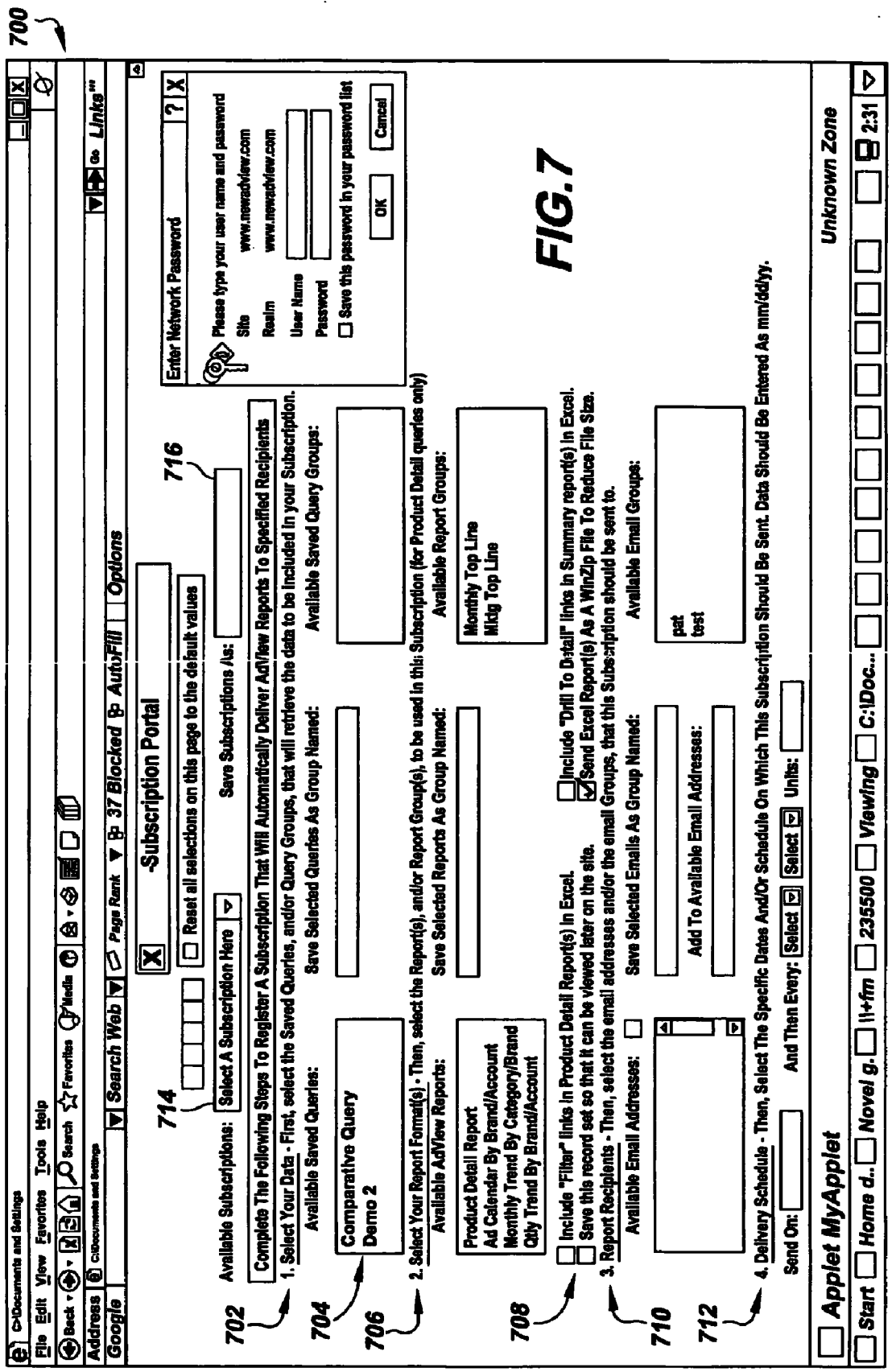

AUTOMATIC CREATION OF OUTPUT FILE FROM IMAGES IN DATABASE

CROSS-REFERENCE TO RELATED APPLICATIONS

This application claims the benefit of U.S. Provisional Application No. 60/558,007, filed Mar. 31, 2004, which is hereby incorporated herein by reference in its entirety.

BACKGROUND OF THE INVENTION

1. Technical Field

The present invention generally relates to presenting database information. More particularly, the present invention relates to the automatic creation of an output file including at least one image and identifying information therefor obtained from a database.

2. Background Information

Databases contain many different types of information, including information related to digital or digitized images. Databases can contain images and/or pointers to images that are stored externally to the database, and/or information about the images. A wide variety of industries utilize databases related to images. For example, retailers, manufacturers, brokers, ad agencies and other companies use images of products and services that are offered for sale in advertisements. Many companies have found it useful to analyze advertising images, typically in digital or digitized form (making it possible to include them or pointers to them in a database), to gain insight into how different approaches affect sales of a given product (or service) or group of products, to understand how the volume and type of advertising for one brand or product compares to that of other brands and products, to verify that advertisements have been presented for review by consumers so that payments that are contingent on such advertising placements can be made, to review trademark usage by various advertisers, and for many other purposes.

Typically, advertising image databases contain or reference digital representations of advertising images, along with varying degrees of information about the advertising images. As with many databases, queries can be run against the data to retrieve specific information which contains references to the images or retrieve the images themselves. While it can be helpful to review the results of such queries on-line, there is also a significant need for offline review and/or sharing of query results or portions thereof. This is typically accomplished by a user copying individual images from the database to a local workstation or personal computer where the image can then be manipulated locally. This manipulation frequently takes the form of a user inserting the image into a word processing program or a presentation program, such as Microsoft PowerPoint or Adobe Acrobat, resizing the image to fit properly within the allocated space, and manually inserting identifying information related to the image so that others who subsequently view the image can understand the source and relevance of the image. When multiple images are inserted in such programs, additional time must be devoted to creating a template to organize the way the images and related identifying information are presented. This is a very time consuming and inefficient process, which significantly reduces the extent to which images retrieved from databases are used in word processing and presentation programs.

Thus, a need exists for a flexible and efficient method of creating documents, and other ways of presenting information, that enable people to view images and identifying information related thereto that have been retrieved from a database, offline from the database.

SUMMARY OF THE INVENTION

Briefly, the present invention satisfies the need for a flexible way to view image query results or portions thereof offline from the database, by automatically creating, in response to a request, output files that include one or more images and identifying information for the images in a multitude of formats and layouts. These output files can then be viewed offline and/or shared with others.

In accordance with the above, it is an object of the present invention to provide the automatic creation of at least one output file including at least one image and identifying information therefor.

The present invention provides, in a first aspect, a method of creating output file from images. The method comprises processing a query by a processor against information in a database regarding a plurality of images and generating query results. The method also comprises selecting at least one image from the generated query results, selecting an output file type, and selecting a delivery method. The method further comprises automatically creating at least one stand-alone output file with the file corresponding to the selected output file type, wherein the at least one created stand-alone output file comprises the at least one selected image and preexisting identifying information for the at least one selected image, and sending the at least one created stand-alone output file to a destination corresponding to the selected delivery method.

System and computer program products corresponding to the above-summarized methods are also described and claimed herein.

These, and other objects, features and advantages of this invention will become apparent from the following detailed description of the various aspects of the invention taken in conjunction with the accompanying drawings.

BRIEF DESCRIPTION OF THE DRAWINGS

FIG. 2 depicts one example of a central query page.

FIG. 4 depicts one example of a page for choosing one or more templates to be used to create the requested output file(s).

FIG. 7 depicts one example of a page for creating a subscription.

DETAILED DESCRIPTION OF THE INVENTION

Figure 1:
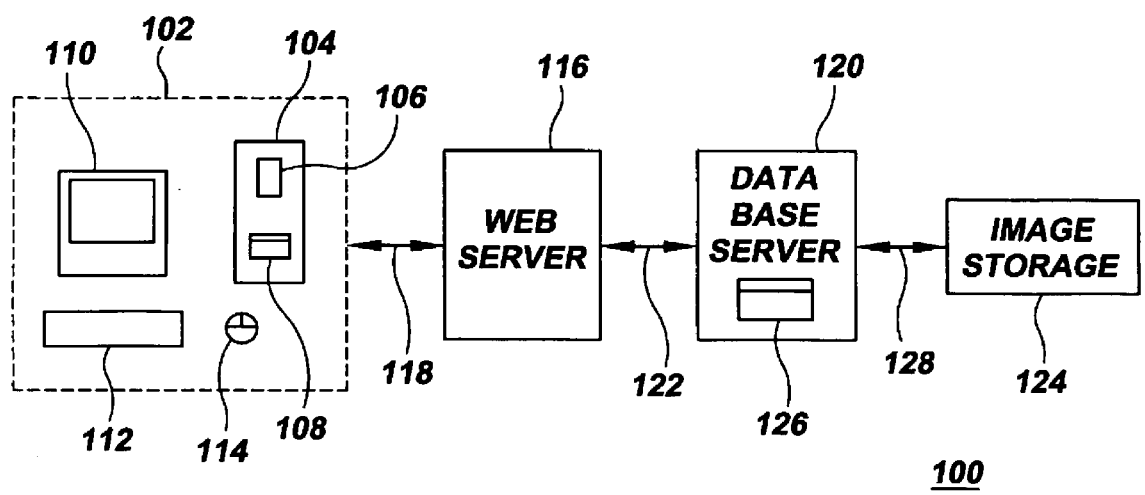
FIG. 1 depicts one example of a system in accordance with the present invention.

FIG. 1 depicts one example of a system 100 for presenting database information, in accordance with the present invention. System 100 comprises a conventional user computer 102, which can take many different forms. As one example, user computer 102 comprises a conventional housing 104 within which is at least one processor 106, and at least one storage device 108. In this example, user computer 102 also comprises a monitor 110, and two input devices, a keyboard 112 and a mouse 114. The computer runs some type of operating system, e.g., some version of Microsoft Windows. The user computer could instead be a notebook computer, hand-held computer, etc. and the components could be different, for example, a different pointing device, multiple processors, multiple storage devices, storage in another location, just to name a few.

System 100 further comprises, in this example, a conventional web server 116 that communicates with computer 102 over a global communications network 118 (e.g., the Internet) via, for example, TCP/IP (a standard communications protocol). A database server 120 communicates with web server 116 over a network 122. In one example, the network is a local area network. In another example, the network is a wide area network. In yet another example, the network is a global communications network (e.g., the Internet). Database server 120 accesses image storage 124 over a network 128. Image storage 124 is, for example, another server that simply acts as storage for the images.

It will be understood that system 100 is merely one example of a system in accordance with the present invention. Many different configurations of such a system are possible. For example, there need not be a web server at all, the database server 120 and computer 102 may communicate directly over a network, such as, for example, a local area network. In addition, any of the networks noted in the example could be wireless or wired. Still further, image storage 124 need not be separate from database server 120; they could be part of the same physical machine. Similarly, web server 116 need not be physically separate from database server 120. As yet another example, a user could access database server 120 directly, rather than from user computer 102.

Database server 120 runs a database program, for example, Microsoft SQL Server, and comprises, for example, a database 126 of information related to advertising images. The information includes, for example, pointers to page images stored in image storage 124, pointers to images of portions of page images stored in image storage 124, pointers to images of web page ads stored in image storage 124, pointers to images of portions of web page ads stored in image storage 124, pointers to additional sizes of any of the images described previously, and information about the images. Page images are images of entire pages that contain advertisements that might be published, for example, in a magazine, as part of a local newspaper, or on a web page. The database could, instead of pointers to the advertising images hold the images themselves. In that case, image storage 124 would not be necessary, though it could be used as a backup for the database.

The information about the advertising images may include any or all of, for example, the geographic market(s) in which the ad appeared, the date(s) the ad appeared, the advertiser that placed the ad, what type of media the ad appeared in, a description of one or more products shown, the brand(s), the category or categories for the product(s), the advertised prices for the product(s), any restrictions on the offer, and additional information of this sort. Other types of images would have different relevant identifying information. As with most databases, queries can be run against the information in the database.

Figure 2:
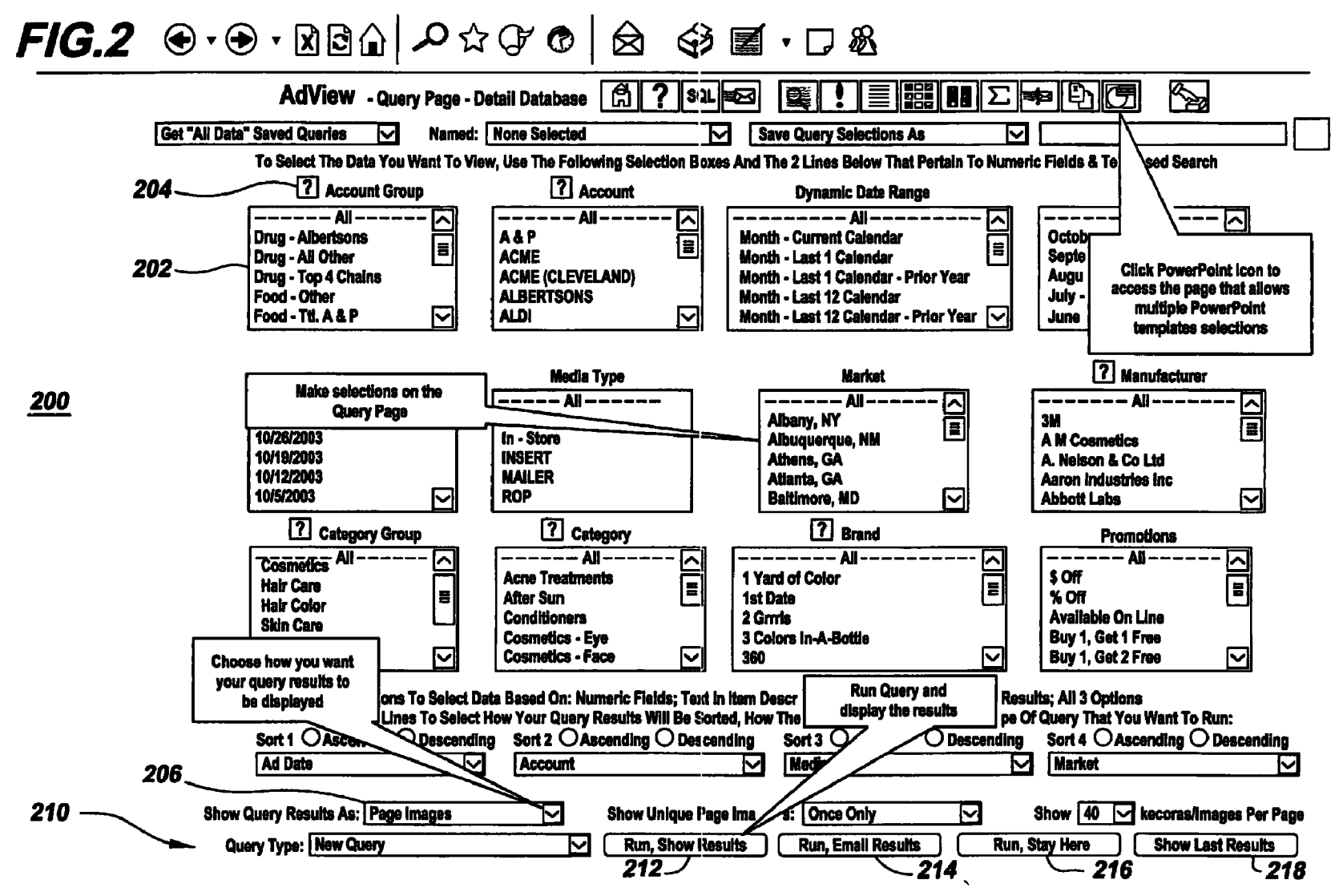

One example of the operation of the present invention will now be described with reference to system 100 of FIG. 1. Initial queries against database 126 are run from a central query page 200, shown in FIG. 2. The user interface for making queries can be implemented in many different ways, FIG. 2 merely being one example. The central query page is presented in this example as a web page to a user of computer 102 in a web browser on monitor 110. The central query page comprises a plurality of scrollable boxes (e.g., box 202), one for each type of information in the database. For example, box 202 relates to Account, and includes a list of retailers included in the database and a choice to select all retailers listed in that box. A user makes one or more choices in each box using, for example, keyboard 112 and/or mouse 114.

A drop-down box 206 includes a choice for how the query results will be presented to the user. For example, the results can be shown as page images. As another example, the results can be shown as product images; that is, a portion of a page image showing, for example, one or more products or services. As still another example, the user can choose to skip viewing the results of the query at this time, and instead choose to have the results emailed, or have an output file created in a particular format. For example, the output file could be created as a presentation application file (e.g., Microsoft PowerPoint), as a spreadsheet file (e.g., Microsoft Excel), as a word processing application file (e.g., Microsoft Word), or as an image file (e.g., in Adobe PDF format) for use in an imaging application (e.g., various Adobe products), to name only a few.

A series of action buttons 210 cause some action to take place. For example, action button 212 instructs that the query should be run and the results shown (on display 110) in accordance with the choices made. As another example, action button 214 instructs to run the query and email the results. This button can be used in conjunction with drop-down box 206 to have the query results emailed as page or product images, for example. As still another example, action button 216 instructs to run the query, but stay on the central query page. As yet another example, action button 218 instructs to show the results of the last query that was run by the user during the current session.

Figure 3:
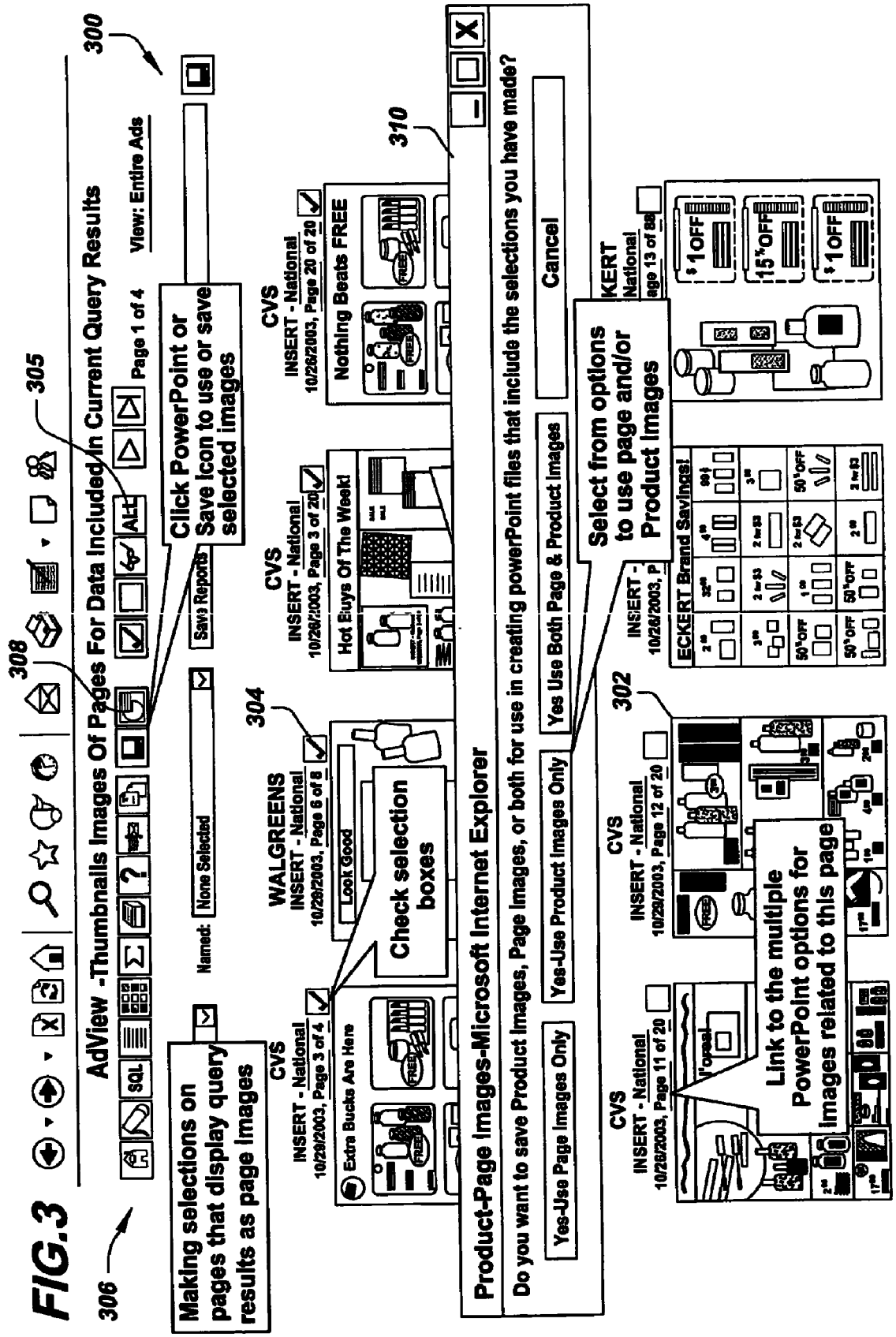
FIG. 3 depicts one example of query results 300 shown as images of entire pages in ads.

FIG. 3 depicts one example of query results 300 shown as page images (e.g., page image 302), and how the query results can be used to create an output file. In some manner, one or more page images can be selected for further use or to be included in an output file(s). For example, simple check boxes (e.g., check box 304) can be used for selecting images, or the user can use an icon 305 in the toolbar to select all images After one or more images are selected, an indication of which type of output file is made in some manner. For example, a number of icons 306 are provided along the top for various purposes, including indicating the type of output file. For example, a user might click on an icon 308 to indicate the type of output file as a presentation application file. In this specific example, an icon for Microsoft PowerPoint is provided. After clicking on icon 308, a popup box 310 appears, asking the user to choose what types of images to save for use in creating the output file; in this example, page images, product images or both.

Figure 4:
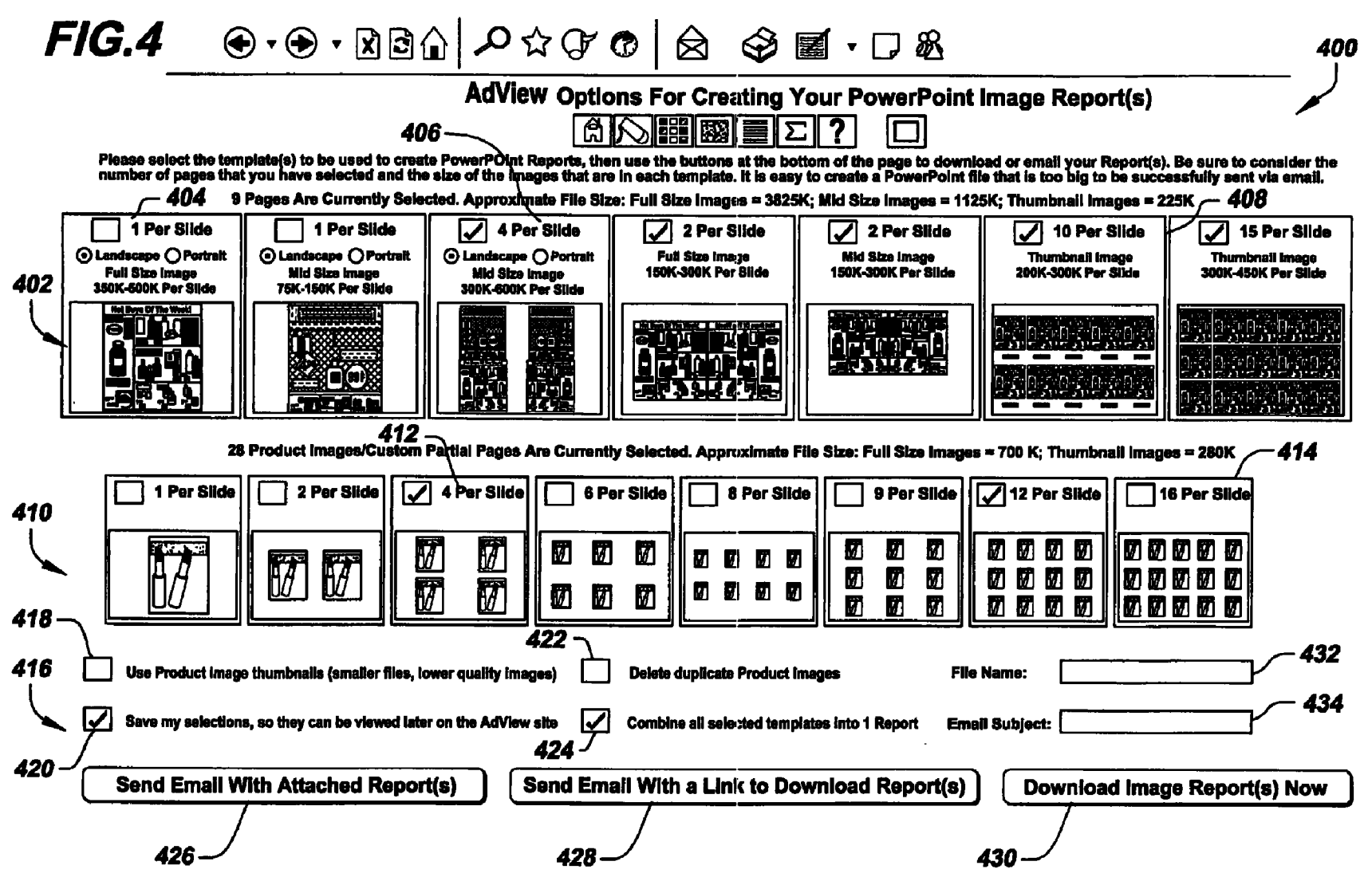

In addition to making the choice for the type(s) of image, unless the presentation application output file is provided in only one layout, the user also needs to indicate the layout of the images on the slides. In the present example, the user is asked to choose from among a multitude of predefined layout templates. Alternatively, the user could be allowed to create a custom layout template, as another example. If a different type of output file were chosen, different choices would be presented. Returning to the present example, FIG. 4 depicts a screen 400 showing choices in a top row 402 for example templates that use page images. For example, one possible choice is template 404, using full size images, one per slide, in either landscape or portrait orientation. As another example, template 406 uses four mid-size page images per slide in either landscape or portrait orientation. As still another example, template 408 uses 10 thumbnail-size images per slide. In a bottom row 410, example choices are given for partial-page images (i.e., product images or custom images). For example, template 412 places four such images on each slide, while template 414 places 12 partial-page images per slide.

Further template examples include combining multiple images of one or more individual products, combining page images from one or more advertisements (e.g., two pages, four pages or more), combining related or unrelated product and page images (e.g., a product image and page in which it is included), combining one or more product and/or page images with data pertaining to sales of one or more products and/or services therein or sales resulting from an advertisement.

The bottom 416 of FIG. 4 shows a number of other choices that can be made. For example, a user can choose to have only product image thumbnails 418, saving the selections made, so they can be viewed again later 420, deleting duplicate product images 422, and combining all selected images into one report 424 (in one embodiment, the default is that each template chosen results in a separate output file). In addition, the user can choose to send the output file(s) attached to an email 426, send an email with a link to download the output file(s) 428, or download the output file(s) now 430 (e.g., via web server 116 in FIG. 1). A name 432 can be specified by the user to be used to name the output file(s), as well as the text to be used in the email subject line 434.

Figure 5:
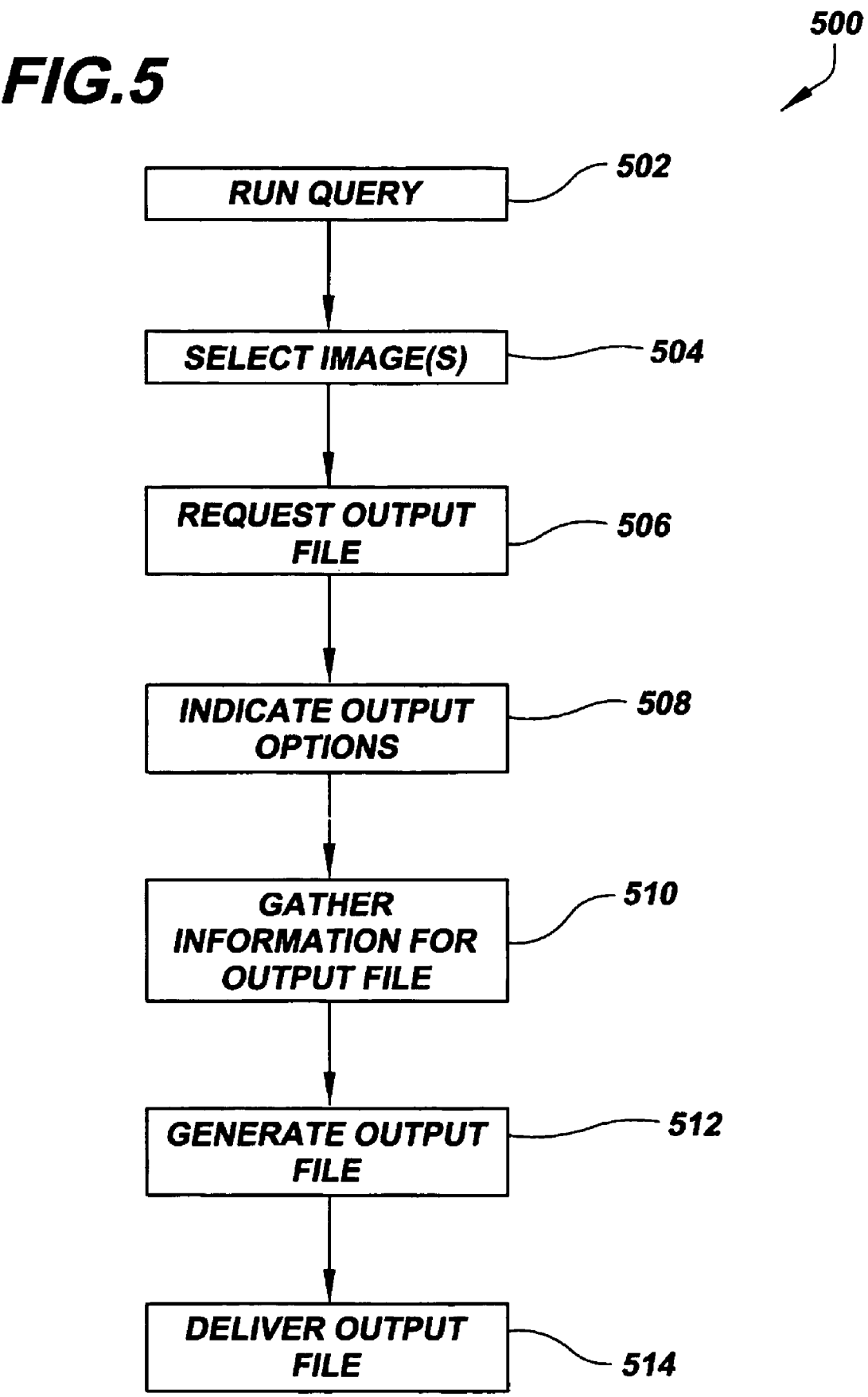
FIG. 5 is a flow diagram for one of example of automatic creation of an output file including at least one image and identifying information therefor.

FIG. 5 is a flow diagram 500 for one example of automatic creation of an output file including at least one image and identifying information therefor, described with reference to the system 100 of FIG. 1. The relevant identifying information for an image will vary depending on the type of image, and the needs of the users. In the present example, the images are advertising images. The users of such images typically need to know, at a minimum, the date(s) the image appeared publicly and an indication of where it appeared, for example, as a supplement in a particular newspaper or on a particular web site. It could also include, for example, any or all of the information described with respect to database 126 in FIG. 1.

In some manner, either initiated by a user or in an automated fashion under a subscription previously requested by a user, a query is run 502 against database 126. Based on this query, one or more images are selected 504 for further use or for use in automatically creating an output file in response to a request therefor. Once at least one image is selected, a request is made 506, in some manner, for an output file for the selected image(s) and identifying information therefor. The request can be made by a user during the present session, or can be part of an automated subscription that periodically updates the query results. When initiated by a user during the present session, the request can come at various points during the session. One example was described with respect to FIG. 3. Output options are made 508 by the user, again either currently or previously, such as, for example, the size of image(s) to use, the delivery method and the template (where applicable, depending on the type of output file), as explained in detail above. Database server 120 then begins gathering 510 the information necessary to create the requested output file. Once all the necessary information has been gathered, the requested output file is generated 512 and delivered 514, in accordance with the output options indicated.

A subscription is essentially an automated database query according to variables chosen by a user. For example, one or more previously executed queries and/or query groups are configured according to format, recipient and schedule choices made by the user. FIG. 7 depicts one example of a page 700 for creating a subscription. A user first chooses 702 the data to be included in the subscription, for example, saved queries 704 and/or query groups. Next, the user selects 706 the report format(s) and/or format group(s) to be used for the subscription, with various suboptions 708 also available. The user then indicates 710 who the recipients are, by selecting email addresses and/or email groups that the output of the subscription will be automatically sent to. The user also indicates 712 what the subscription delivery schedule will be, such as once only, or on a recurring basis, with or without an ending date. A name 716 is also chosen for the subscription to easily identify it later on. The configuration of a previously created subscription can be modified, for example, by choosing it from the "available subscriptions" drop-down list.

The automatic creation of an output file can be accomplished, for example, using computer programming executing on, for example, database server 120 in FIG. 1. The programming can be done in a multitude of ways known to one of ordinary skill in the art, for example, using Microsoft Visual Basic or Microsoft.net.

Figure 6:
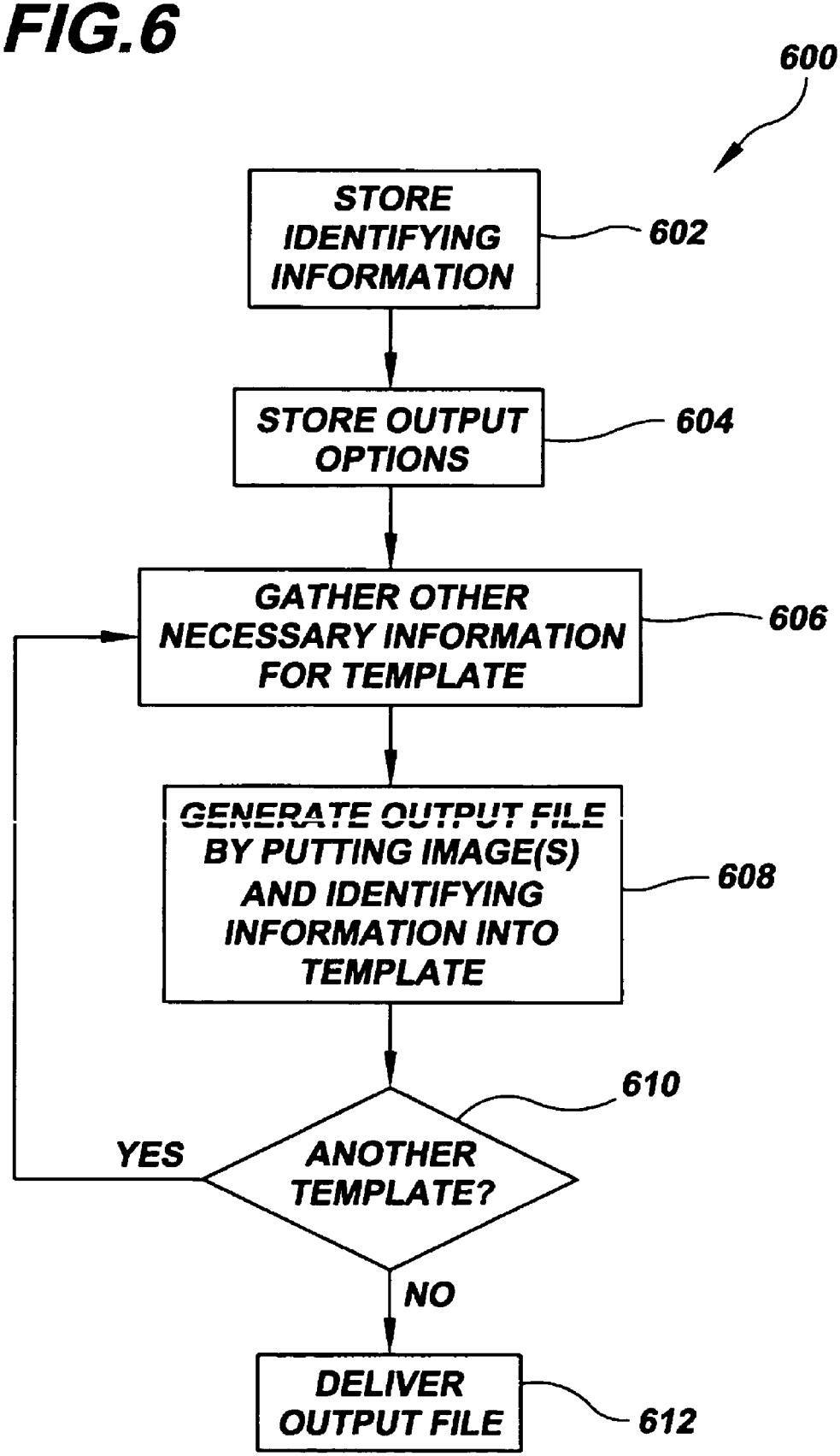
FIG. 6 is a flow diagram for a more detailed example of automatic creation of an output file including at least one image and identifying information therefor.

FIG. 6 is a flow diagram 600 for a more detailed example of the automatic creation of an output file including at least one image and identifying information therefor. Flow diagram 600 assumes a case where there are predefined output file templates to choose from. When an image is selected for further use or for use with an output file, identifying information for the image is stored, for example, on database server 120 in system 100 of FIG. 1. In the FIG. 1 scenario, the actual images are stored in image storage 124, and database server 120 uses pointers to the stored images. Thus, in the present example, the identifying information comprises the pointer for a given image. After output options are made, they are also stored 604, for example, on database server 120.

Any information necessary for generating the output file in the template chosen, and which is not already available, is gathered 606. The necessary information will depend on the type of output file, but might include, for example, a file name, whether any compression will be applied to the file, what image(s) go on a given slide (where the type of output file is a presentation application file), any custom images, color scheme(s), images size(s), email address(es), and an email subject, just to name a few. Gathering the necessary information could include the need to request information from the user.

After the necessary information has been gathered, the output file is generated 608 by putting the image(s) and identifying information into the template. An inquiry 610 is then made as to whether there is another template that needs to be populated. If there is another template to be populated, step 606 is returned to. If there is no other template to be populated, the output file(s) is delivered 612.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are consider a part of the claimed invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of creating an output file from images, comprising:
   processing a query by a processor against information in a database regarding a plurality of images and generating query results;
   selecting at least one image from the generated query results;
   selecting an output file type;
   selecting a delivery method;
   automatically creating at least one stand-alone output file with the file type corresponding to the selected output file type, wherein the at least one created stand-alone output file comprises the at least one selected image and preexisting identifying information for the at least one selected image; and
   sending the at least one created stand-alone output file to a destination corresponding to the selected delivery method.

2. The method of claim 1, wherein at least one output option is displayed for selecting.

3. The method of claim 2, wherein the at least one output option comprises at least one output file type for the at least one created stand-alone output file.

4. The method of claim 3, wherein the at least one output file type comprises an output file of a presentation application.

5. The method of claim 3, wherein the at least one output file type comprises an output file of a spreadsheet application.

6. The method of claim 3, wherein the at least one output file type comprises an output file of a word processing application.

7. The method of claim 3, wherein the at least one output file type comprises an output file of an imaging application.

8. The method of claim 2, wherein the at least one output option comprises a size for the at least one selected image.

9. The method of claim 2, wherein the at least one output option comprises a layout for the at least one created stand-alone output file.

10. The method of claim 9, wherein the layout comprises a template, and wherein at least one predefined option for the template is selected.

11. The method of claim 9, wherein the layout comprises a predefined template.

12. The method of claim 11, wherein the predefined template comprises an image of a single advertising page previously used in advertising.

13. The method of claim 11, wherein the predefined template comprises at least one image of at least one page of a multi-page advertisement previously used in advertising.

14. The method of claim 13, wherein the predefined template comprises at least one image of two pages of a preexisting multi-page advertisement.

15. The method of claim 11, wherein the predefined template comprises a plurality of thumbnail images of pages in a preexisting multi-page advertisement.

16. The method of claim 11, wherein the predefined template comprises at least one image of four pages from at least one preexisting advertisement.

17. The method of claim 11, wherein the predefined template comprises a plurality of product images.

18. The method of claim 11, wherein the predefined template comprises at least one product image and a preexisting advertisement page comprising the at least one product image.

19. The method of claim 11, wherein the predefined template comprises at least one product image and data pertaining to sales resulting from the at least one product image.

20. The method of claim 11, wherein the predefined template comprises at least one image of at least one advertising page previously used in advertising, wherein the at least one advertising page comprises a plurality of at least one of a product and a service, the predefined template further comprising data pertaining to sales resulting from the at least one advertising page.

21. The method of claim 1, wherein the delivery method comprises at least one of an email with an attachment of the at least one created stand-alone output file, an email that includes a hyperlink for downloading the at least one created stand-alone output file, and directly downloading the at least one created stand-alone output file.

22. The method of claim 1, wherein the automatically creating comprises:
   automatically gathering information necessary to create the at least one stand-alone output file; and
   automatically generating the at least one stand-alone output file using the gathered information.

23. The method of claim 1, wherein the at least one stand-alone output file is created in response to a request that is received over a network.

24. The method of claim 23, wherein the network comprises a global communications network.

25. The method of claim 1, wherein the at least one image comprises at least one advertising image previously used in advertising.

26. The method of claim 25, wherein the at least one advertising image comprises at least one of a product image and a page image, wherein a product image comprises a portion of a page image comprising at least one of a product and a service.

27. The method of claim 1, further comprising displaying the generated query results.

28. The method of claim 1, further comprising:
   reprocessing the query against the database and generating updated query results at a subsequent time; and
   automatically creating at least one other stand-alone output file based on the updated query results, wherein the at least one image and preexisting identifying information therefor are part of the at least one other created stand-alone output file.

29. The method of claim 28, wherein the reprocessing comprises automatically reprocessing, and wherein the automatically reprocessing and automatically creating at least one other stand-alone output file are performed in accordance with a subscription.

30. The method of claim 29, further comprising providing at least one other created stand-alone output file to a subscriber.

31. The method of claim 1, wherein at least some of the plurality of images are stored outside the database, and wherein the information comprises pointers to the at least some of the plurality of images.

32. The method of claim 31, wherein the at least some of the plurality of images is stored remotely from the database.

33. The method of claim 1, wherein the preexisting identifying information comprises at least one description of content of the at least one image.

34. A computer system for creating an output file from images, the computer system comprising:
   storage storing a database comprising information regarding a plurality of images and identifying information therefor;
   a memory;
   a processor in communications with the memory to execute a method of presenting database information, the method comprising:
      processing a query against the information in the database and generating query results;
      selecting at least one image from the generated query results;
      selecting an output file type;
      selecting a delivery method;
      automatically creating at least one stand-alone output file with the file type corresponding to the selected output file type, wherein the at least one created stand-alone output file comprises the at least one selected image and preexisting identifying information for the at least one selected image; and
      sending the at least one created stand-alone output file to a destination corresponding to the selected delivery method.

35. The computer system of claim 34, wherein at least one output option is displayed for selecting.

36. The computer system of claim 35, wherein the at least one output option comprises at least one output file type for the at least one created stand-alone output file, and wherein the at least one output file type comprises at least one of a presentation application output file, a spreadsheet application output file, a word processing application output file, and an imaging application output file.

37. The computer system of claim 35, wherein the at least one output option comprises at least one of a size for the at least one selected image and a layout for the at least one created stand-alone output file.

38. The computer system of claim 34, wherein the automatically creating comprises:
   automatically gathering information necessary to create the at least one stand-alone output file; and
   automatically generating the at least one stand-alone output file using the gathered information.

39. The computer system of claim 34, further comprising:
   reprocessing the query against the database and generating updated query results at a subsequent time; and
   automatically creating at least one other stand-alone output file based on the updated query results, wherein the at least one other stand-alone output file includes the at least one image and preexisting identifying information therefor.

40. The computer system of claim 34, wherein at least some of the plurality of images are stored outside the database, and wherein the information comprises pointers to the at least some of the plurality of images.

41. The computer system of claim 40, further comprising additional storage separate from the storage for storing the at least some of the plurality of images.

42. The computer system of claim 34, wherein the preexisting identifying information comprises at least one description of content of the at least one image.

43. A computer program product for creating an output file from images, the computer program product comprising:
   a storage medium readable by a processor and storing programming for execution by the processor for performing a method of presenting database information, the method comprising:
      processing a query against information in a database regarding a plurality of images and generating query results;
      selecting at least one image from the generated query results;
      selecting an output file type;
      selecting a delivery method;
      automatically creating at least one stand-alone output file with the file type corresponding to the selected output file type, wherein the at least one created stand-alone output file comprises the at least one selected image and preexisting identifying information for the at least one selected image; and
      sending the at least one created stand-alone output file to a destination corresponding to the selected delivery method.

44. The computer program product of claim 43, wherein at least one output option is displayed for selecting.

45. The computer program product of claim 44, wherein the at least one output option comprises at least one output file type for the at least one created stand-alone output file, and wherein the at least one output file type comprises at least one of a presentation application output file, a spreadsheet application output file, a word processing application output file, and an imaging application output file.

46. The computer program product of claim 44, wherein the at least one output option comprises choosing at least one of a size for the at least one selected image and a layout for the at least one created stand-alone output file.

47. The computer program product of claim 43, wherein the automatically creating comprises:
   automatically gathering information necessary to create the at least one stand-alone output file; and
   automatically generating the at least one stand-alone output file using the gathered information.

48. The computer program product of claim 43, further comprising:
   reprocessing the query against the database and means for generating updated query results at a subsequent time; and
   automatically creating at least one other stand-alone output file based on the updated query results, wherein the at least one other stand-alone output file includes the at least one image and preexisting identifying information therefor.

49. The computer program product of claim 43, wherein at least some of the plurality of images are stored outside the database, and wherein the information comprises pointers to the at least some of the plurality of images.

50. The computer program product of claim 49, wherein the at least some of the plurality of images is stored remotely from the database.

51. The computer program product of claim 43, wherein the preexisting identifying information comprises at least one description of content of the at least one image.

* * * * *